US011580321B2

(12) United States Patent
Wentz

(10) Patent No.: US 11,580,321 B2
(45) Date of Patent: Feb. 14, 2023

(54) SYSTEMS, DEVICES, AND METHODS FOR MACHINE LEARNING USING A DISTRIBUTED FRAMEWORK

(71) Applicant: Ares Technologies, Inc., Cambridge, MA (US)

(72) Inventor: Christian Wentz, Providence, RI (US)

(73) Assignee: Ares Technologies, Inc., Boston, MA (US)

( * ) Notice: Subject to any disclaimer, the term of this patent is extended or adjusted under 35 U.S.C. 154(b) by 402 days.

(21) Appl. No.: 16/843,403

(22) Filed: Apr. 8, 2020

(65) Prior Publication Data

US 2020/0320340 A1    Oct. 8, 2020

Related U.S. Application Data

(60) Provisional application No. 62/831,036, filed on Apr. 8, 2019.

(51) Int. Cl.
*G06K 9/62* (2022.01)
*G06F 9/46* (2006.01)
*G06N 20/00* (2019.01)

(52) U.S. Cl.
CPC .......... *G06K 9/6221* (2013.01); *G06F 9/465* (2013.01); *G06K 9/6215* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,584,517 B1 | 2/2017 | Roth | |
| 10,235,625 B1 * | 3/2019 | Walters | G06N 3/04 |
| 2009/0271618 A1 | 10/2009 | Camenisch | |
| 2014/0173274 A1 | 6/2014 | Chen | |
| 2014/0366111 A1 | 12/2014 | Sheller | |
| 2015/0256341 A1 | 9/2015 | Ye | |
| 2017/0178237 A1 | 6/2017 | Wong | |
| 2017/0249464 A1 | 8/2017 | Maximov | |

(Continued)

FOREIGN PATENT DOCUMENTS

| | | | | |
|---|---|---|---|---|
| CN | 110059186 A | * | 7/2019 | |
| CN | 110244901 A | * | 9/2019 | G06F 3/0614 |

(Continued)

OTHER PUBLICATIONS

Timo Hanke, Dfinity Technology Overview Series Consensus System, Jan. 23, 2018.

(Continued)

*Primary Examiner* — Mohammed Rachedine
(74) *Attorney, Agent, or Firm* — Caldwell Intellectual Property Law

(57) ABSTRACT

In another aspect, a system for machine learning using a distributed framework, includes a computing device communicatively connected to a plurality of remote devices, the computing device designed and configured to select at least a remote device of a plurality of remote devices, determine a confidence level of the at least a remote device, and assign at least a machine-learning task to the at least a remote device, wherein assigning further comprises assigning at least a secure data storage task to the at least a remote device and assigning at least a model-generation task to the at least a remote device.

18 Claims, 4 Drawing Sheets

(56) References Cited

U.S. PATENT DOCUMENTS

2017/0374151 A1* 12/2017 Moorthi .............. H04L 67/1097
2018/0034642 A1    2/2018 Kaehler
2019/0205745 A1* 7/2019 Sridharan ................ G06N 3/08
2021/0373521 A1* 12/2021 Jetzfellner ......... G05B 19/0428

FOREIGN PATENT DOCUMENTS

| CN | 110431806 A | * | 11/2019 | ........... G06F 9/3836 |
| CN | 111767121 A | * | 10/2020 | ......... G06F 13/1673 |

OTHER PUBLICATIONS

Peter Robinson, Decentralized Random Number Generation, Jul. 5, 2018, Consensys.

* cited by examiner

SYSTEMS, DEVICES, AND METHODS FOR MACHINE LEARNING USING A DISTRIBUTED FRAMEWORK

CROSS-REFERENCE TO RELATED APPLICATIONS

This application claims the benefit of priority of U.S. Provisional Patent Application Ser. No. 62/831,036, filed on Apr. 8, 2019, and titled "SYSTEMS, DEVICES, AND METHODS FOR MACHINE LEARNING USING A DISTRIBUTED FRAMEWORK," which is incorporated by reference herein in its entirety.

FIELD OF THE INVENTION

The present invention generally relates to the field of data storage and authentication in distributed computing systems. In particular, the present invention is directed to systems, devices, and methods for machine learning using a distributed framework.

BACKGROUND

Machine learning is an increasingly indispensable part of modern technology, but involves intensive processing of large quantities of data, often sensitive or private in nature. Distributed frameworks can provide a useful way to perform complex computation, or computation involving large datasets, rapidly and efficiently, as well as a way to distribute computational tasks across multiple devices. However, processes for selection and use of distributed frameworks are often inefficient or insecure, may over-rely on centrally managed security, or may suffer a lack of efficient scalability. Machine learning using such frameworks is thus often prohibitively insecure and inefficient.

SUMMARY OF THE DISCLOSURE

In an aspect, a method of machine learning using a distributed framework includes selecting, by a computing device, at least a remote device of a plurality of remote devices. The method includes determining, by the computing device, a confidence level of the at least a remote device. The method includes assigning, by the computing device, at least a machine-learning task to the at least a remote device, wherein assigning further includes assigning at least a secure data storage task to the at least a remote device and assigning at least a model-generation task to the at least a remote device.

In another aspect, a system for machine learning using a distributed framework, includes a computing device communicatively connected to a plurality of remote devices, the computing device designed and configured to select at least a remote device of a plurality of remote devices, determine a confidence level of the at least a remote device, and assign at least a machine-learning task to the at least a remote device, wherein assigning further comprises assigning at least a secure data storage task to the at least a remote device and assigning at least a model-generation task to the at least a remote device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
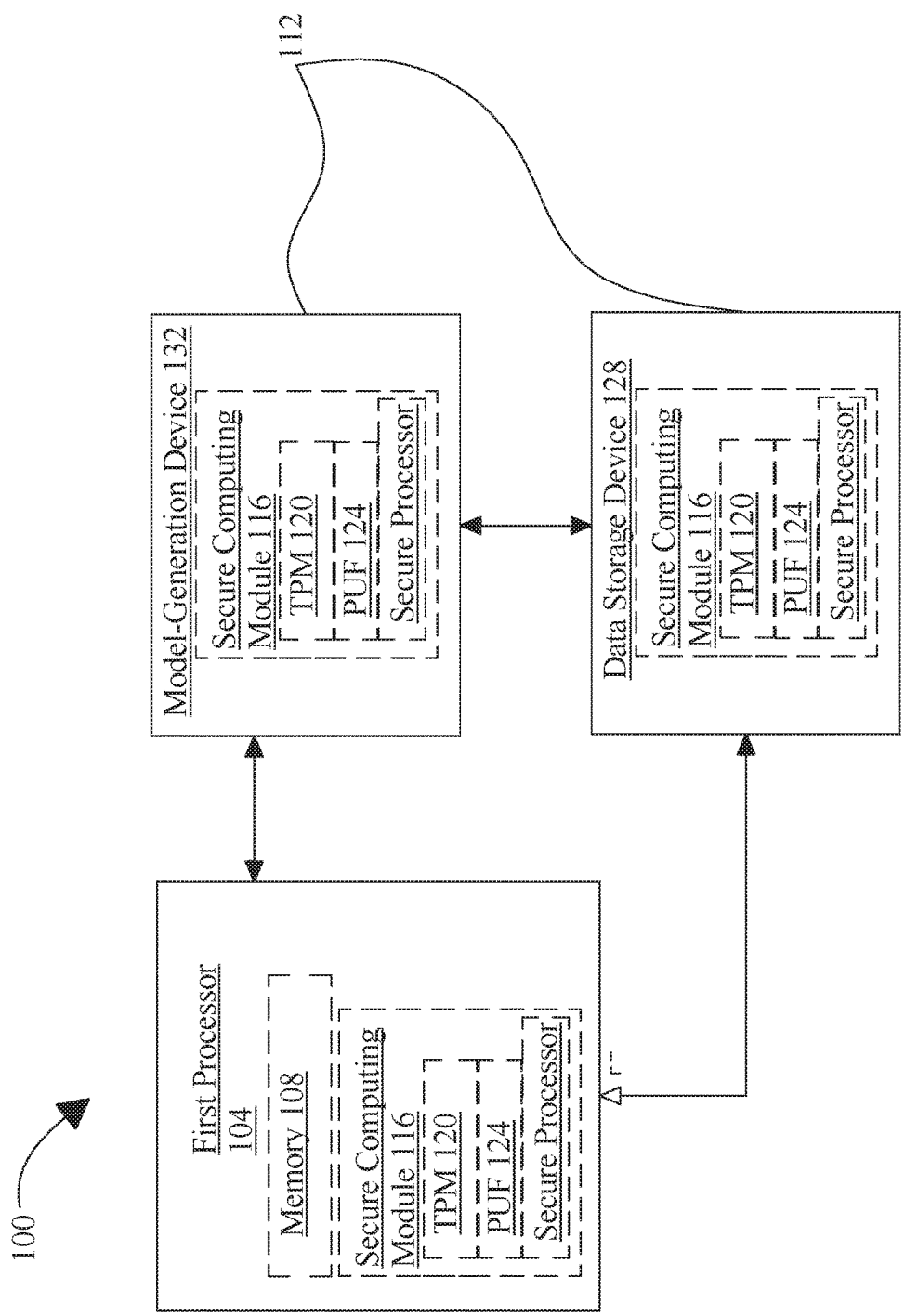
FIG. 1 is a block diagram illustrating an exemplary embodiment of a system for machine learning using a distributed framework.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In an embodiment, disclosed systems and methods present a flexible, scalable, and reliable method for selecting and deploying an optimally secure and efficient distributed network. Use of trusted hardware and related technology may enable rapid and decentralized authentication of devices; in embodiments, block-chains or similar distributed data management facilities may be used in authentication and device selection, permitting efficiency of rapid lookup to be coupled to reliability of consensus and other methods for authentication.

Systems and methods as described herein may involve computation, calculation, assessment, assignment, or use of a confidence level associated with one or more processes, devices, or data, including without limitation one or more processes, appraisals, and/or remote devices as described herein. Confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability. As a non-limiting example, extremum representing maximal degree of reliability may be a maximal number of an ordered set of numbers such as an open or closed set on the real number line, a sequential listing of integers or natural numbers, or the like; persons skilled in the art will be aware that selection of a numerical extremum to represent a higher level of confidence or reliability, albeit intuitively pleasing, is not mathematically necessary, and any suitable mapping of level of confidence or reliability to numerical objects or ranges may feasibly be substituted. As a further non-limiting example, numerical score may include, or be mappable to, a probability score, such as a percentage probability or a 0-1 probability level. Confidence level may include further information or indications, such as without limitation flags denoting untrustworthy, suspect, or hostile elements; for instance, a flag may indicate that a particular device, program, process, or element of data appears to be compromised and/or has been involved in fraudulent or otherwise hostile or disruptive engagement with system 100 and/or methods described herein in the past. Methods of aggregating, computing, and/or using confidence levels will be described in further detail below. Persons skilled in the art, upon reviewing the entirety of this disclosure, will be aware of various ways in which confidence levels may be implemented, calculated, assigned, and/or used as consistent with methods and systems disclosed herein.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is lossy, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, a system 100 for selecting a distributed framework. System 100 includes a computing device 104. Computing device 104 may include any computing device as described below in reference to FIG. 4. Computing device may include a single processor operating independently, or may include two or more processors operating in concert, in parallel, sequentially or the like; two or more processors may be included together in a single computing device or in two or more computing devices. Computing device may be an element of, be in communication with, or otherwise utilize a secure computing module 116 as described below in further detail. Computing device may be or include a remote device as described below in further detail.

Computing device 104 may include in non-limiting example one or more FPGAs or other programmable logic-based hardware. In the case of programmable logic-based hardware, computing device 104 may incorporate protection mechanisms to ensure the authenticity and confidentiality of the bitstream and other configuration parameters used to set up the desired logic in the programmable logic-based hardware. These protection mechanisms may include public/private key encryption and any other approaches described below. Computing device 104 may further incorporate a random number generator, true random number generator, synthesizable physically unclonable function (PUF) or such similar feature to provide a cryptographically strong seed for public/private key encryption of other methods using private keys, for instance as described in further detail below. Attested properties as described below may in the case of programmable logic further include attestation of the authenticity and or proof of unadulterated configured logic.

Still referring to FIG. 1, computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device with one or more additional devices as described below in further detail via a network interface device. Network interface device may be utilized for connecting a computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device. In a non-limiting example, computing device 104 may be hosted by a third party, e.g. as a "cloud service."

Still referring to FIG. 1, computing device 104 incorporates or communicates with a memory 108. Memory 108 may include any form of memory described below in reference to FIG. 4. Memory 108 may be incorporated in a device containing computing device 104, distributed through several devices, which may contain computing device 104, or a component thereof, or in another device accessible to computing device 104 via electronic communication. Computing device 104 may be in communication and/or communicatively connected with a plurality of remote devices 112; each of plurality of remote devices 112 may include any device suitable for use as computing device 104 as described above.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. As a non-limiting example, computing device 104 may be designed and configured to perform any method step or steps as disclosed herein; as a non-limiting example, computing device 104 may be designed and configured identify at least a remote device of the plurality of remote devices, determine a confidence level of the at least a remote device, at least a remote device from the plurality of remote devices as a function of the at least a remote device as a function of the confidence level, and assign at least a machine-learning task to the distributed framework.

With continued reference to FIG. 1, computing device 104 and/or any remote device of plurality of remote devices may include a secure computing module 116. As used herein, a secure computing module 116 is a hardware element configured to perform one or more secured operations beyond the control of other circuit elements or software, whether incorporated with the secure computing module 116 in a circuit or computing device, or a part of an extrinsic computing device. As a result, at least one secured operation performed by secure computing module 116 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 116 and/or a system or computing device incorporating secure computing module 116 based on the above-described set of assumptions. As a non-limiting, example, a secure computing module 116 designed to produce an expected result despite all software-only attacks may give rise to a first confidence level, whereas another secure computing module 116 designed to produce its expected result in the face of all software or hardware attacks may give rise to a second confidence level; the second confidence level may be higher, owing to the reduced probability that the second secure computing module 116 would be compromised.

Still viewing FIG. 1, secure computing module 116 may include a trusted platform module (TPM 120). In an embodiment, a TPM 120 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 120 may have any suitable elements of digital or analog circuitry usable to perform one or more processes as described herein, including without limitation processes used to determine confidence levels and/or authenticate digitally signed assertions as described below. TPM 120 may have memory and/or other logic and/or a processor in its own right which may be in a non-limiting example a crypto-processor. TPM 120 may have a hard-coded process for signing a digital signature, which may be performed using a private key, which is associated with a public key. This private key and/or signing process may be produced using a genuinely random process during manufacturing, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be extracted via physically unclonable function processes using, for instance, a fuzzy extractor or key extractor physically unclonable function, for instance as described below. Private key extraction may utilize additional corrective measures, including as a non-limiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 116 may include at least PUF 124. PUF 124 may be implemented by various means. In an embodiment, PUF 124 includes one or more non-intrinsic PUFS 116. Non-intrinsic PUFS 116 may include without limitation optics-based PUFS 116. Optics-based PUFS 116 may include, as a nonlimiting example, optical PUFS 116. An optical PUF 124 may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Optical PUF may further include lattice defect based PUFs utilizing point defects in diamond or other lattices, e.g. nitrogen vacancies, C- A- B- and N3 nitrogen vacancies, boron, phosphorous, hydrogen, nickel and cobalt, silicon, germanium and sulfur-based point defects, and multivacancy complexes. In such an implementation, at least a vacancy is present, e.g. in a nanodiamond or nanodiamond coating conformed to a specific device, the conformal coating conferring specific properties establishing a unique signature to that device, within a range of sensitivity. Persons skilled in the art, upon reviewing the entirety of this disclosure, will be aware of various alternative or additional light detection devices that may be used to detect light scattered by scattering medium.

Still referring to FIG. 1 non-intrinsic PUF 124 may include without limitation a radio frequency (RF)-based PUF 124. A radio-frequency PUF 124 may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF 124 may include one or more electronics-based PUFs. Electronics-based PUFs may include, as a nonlimiting example, coating PUFs. In a non-limiting example of a coating PUF 124, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFS 116, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 124 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFS 116 may be similarly constructed. In an embodiment, an intrinsic PUF 124 circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF 124 more immune to environmental variations. However, there may be an increase in the used silicon surface area. Furthermore, these self-timed structures may be prone to entering deadlock states. Intrinsic PUFS may include glitch PUFS; this may also involve a delay-based PUF 124 construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF 124 response.

Continuing to refer to FIG. 1, PUF 124 may include a circuit producing a PUF 124 via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF 124 circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 124 120 in an embodiment include without limitation buskeeper PUFS 116, which may be similar to other PUFS 116 based on bistable memory elements but leveraging buskeeper cells. PUF 124 may also combine two or more PUF 124 designs, for instance a bistable ring PUF 124, which may be a hybrid of a ring oscillator PUF 124 and a SRAM PUF 124, wherein the structure is similar to the ring oscillator PUF 124, but the number of inverting elements is even. This may mean that the loop does not oscillate but is bistable (like the SRAM PUF 124). Using reset logic, the bistable ring may destabilize and subsequently stabilize into a state that is set by the random silicon manufacturing variations Continuing to view FIG. 1, PUF 124 may include mixed-signal PUFs that produce a variable analog signal as determined by small circuit variations; analog signal may be converted to a digital signal using, for instance, an analog-to-digital converter, compared to a threshold voltage to produce a logic 1 or 0 output, or the like. PUFs may be constructed, as a non-limiting example, using threshold voltage PUFs: these may be constructed by connecting identically designed transistors in an addressable array may driving resistive loads; in operation, because of random silicon manufacturing variations, the transistor threshold voltages and current through the load may be random. Similarly, mixed-signal PUFs may include inverter gain PUFs, which may be based on the variable gain of equally designed inverters. The variable gain may be random because of random silicon process variations. Each challenge-response pair may be extracted from a pair of inverters. Mixed-signal PUFS 116 may include super high information content (SHIC) PUFs, which may include an addressable array of diodes implemented as a crossbar memory 256 forms the structure; each diode may be, as a non-limiting example, produced by a crystal-growing process that seeds and produces random variation in crystal growth within the diode, resulting in unpredictably irregular I(U) curves. Read-out time of each memory 256 cell may be influenced by random silicon manufacturing variations and this forms a PUF 124 response. Mixed-signal PUFs may include SRAM failure PUFs. Static noise margin for an individual SRAM cell may depend on random silicon manufacturing variations. As such, each SRAM cell may produce a bit failure at different noise levels, and this may be leveraged to generate a PUF 124 response. In each case, the PUF 124 circuit element producing the variable signal may be connected to an analog to digital converter, comparator, or similar element to produce one or more output bits.

In an embodiment, and still viewing FIG. 1 PUF 124 may include a circuit implementing a quantum PUF 124. A quantum PUF 124, as used herein, is a PUF 124 that generates secrets, such as random numbers, that are unique to the PUF 124 owing to the nanostructure of atomic layers in an electronic or other component, so that the variations are governed by quantum physics, and harder to predict. Quantum PUF 124 may include a quantum confinement PUF 124, which may operate by varying its output according to variations in behavior due to quantum confinement as determined by nanostructure of atomic layers of one or more components. In an embodiment, uniqueness of a quantum PUF 124 or quantum confinement PUF 124 may be made highly probable by the inherently random nature of atomic positions and imperfections in a quantum well. Simulating structures on such a scale may require computationally infeasible amounts of computing power, even for some quantum computers, particularly where multiple quantum PUF 124 elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF 124 may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode-based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF 124 more tamper-resistant, as invasive probing of device would distort nanostructure and change the outputs; alternatively or additionally, a PUF 124 manufactured in this way may be reconfigurable by, for instance, a controlled application of heat causing modifications to the nanostructure. Implementation variations may further include exploitation of changes in PUF 124 response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator a-b. A number of dots in a device such as an RID does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations With continued reference to FIG. 1, PUF 124 may include, without limitation, PUFs implemented using design of vertical interconnect accesses (VIAs) in multi-layered chips or integrated circuits. A "VIA-PUF 124" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF 124. Such a VIA-PUF 124 may be extremely robust over time and across environmental conditions.

Continuing to refer to FIG. 1, PUF 124 may include one or more photonic PUFs. In an embodiment, a photonic PUF 124 may take advantage of the fact that some photonic devices can operate in a non-linear and/or chaotic manner. In a non-limiting example, a photonic PUF 124 is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultrashort optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF 124. Alternative or additional non-linear photonic devices may be used to implement a photonic PUF 124.

Further viewing FIG. 1, other examples of PUF 124 that may be used may include, without limitation, nano-electromechanical (NEM) PUFs. NEM PUFs may include PUFs that leverage stiction of a silicon nanowire to a binary gate structure. NEM PUFs may include those based on interfacial magnetic anisotropy energy, such as use of random distribution of magnetization orientation originating from the sub-nanometer variation of oxide layer produced by the thinning process. In an embodiment, an NEM PUF 124 system may be highly robust; as a non-limiting example, NEM PUF 124 may work effectively across a wide range of environmental conditions, including without limitation thermal variation, exposure to microwave radiation, and exposure to high dose radiation at various frequencies. Additional methods for PUF 124 implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 124 and/or TPM 120; such outputs may be used to generate symmetric or asymmetric keys, private keys, zero-knowledge proofs, or other proofs of authenticity, as described in further detail below.

Continuing to refer to FIG. 1, secure computing module 116 may implement one or more secure memory storage protocols. One or more secure memory storage protocols may be protocols designed to prevent unauthorized access to memory and/or to protect secure computing module 116 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 116. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 116 may incorporate a memory controller located within the trusted computing boundary to encrypt and authenticate by a secret key memory element such as without limitation memory page tables and/or memory pages accessible by other software elements, such as an operating system. Various techniques, processes, means or elements may be used to implement the above-described secure memory protocols. For instance, secure computing module 116 may use hardware-enabled access control to protect memory access; hardware access control may, as a non-limiting example, be performed by tagging each memory entry with a "container identifier" corresponding to a page, file, or other grouping of memory, enabling secure computing module 116 to determine whether tampering has occurred.

Secure computing module 116 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 116 may operate using one or more dedicated memory objects, registers, or storage elements; as a non-limiting example, secure computing module 116 may operate with dedicated cache lines not available to other processes or circuits, preventing, e.g., stack or buffer overrun attacks to corrupt or steal data. Dedicated memory elements may be wired only to secure computing module 116; access to dedicated memory elements may be rendered impossible except by way of secure computing module 116. Secure computing module 116 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 116 may utilize oblivious random-access memory (RAM) wherein memory access patterns are obfuscated to prevent detection of memory access patterns by outside observers attempting to deduce execution details regarding processes performed using secure computing module 116. Secure computing module 116 and/or device incorporating secure computing module 116 may incorporate a trusted non-volatile storage device that provides some means of verification of secure storage capability and other properties. Memory protocols as described above may be used to implement methods of attested storage and the chain of trust beginning at PUF 124 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 116.

Still referring to FIG. 1, secure computing module 116 may include a secure processor. Secure processor may be a processor as described below in reference to FIG. 4. Secure processor may operate autonomously from other processors and/or an operating system operating on at least a remote device; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM 120, to frustrate alteration and/or probing to discover and/or alter private keys. Private keys may be demonstrable as uniquely associated with secure processor by use of PUF 124 as described above; secure processor may include, for instance, a TPM 120 as described above. Alternatively or additionally, a certificate authority as described above, which may be a manufacturer of secure processor, may verify that one or more public keys are associated uniquely with secure processor according to any protocol suitable for digital certificates.

Still referring to FIG. 1, any computing device described in this disclosure may be configured to generate digital signatures. A digital signature as used herein is an application of a secure proof of a secret possessed by a particular device and/or user thereof to an element or lot of data, or to a verifiable mathematical representation of the element or lot of data, which may include a cryptographic hash as described above. A secure proof, as used herein, is a protocol whereby an output is generated that demonstrates possession of a secret, such as module-specific secret, without demonstrating the entirety of the module-specific secret; in other words, a secure proof by itself, is insufficient to reconstruct the entire module-specific secret, enabling the production of at least another secure proof using at least a module-specific secret. Where at least a module-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a module-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a module-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A digital signature may include, without limitation, an encrypted mathematical representation of a file or other set of data using the private key of a public key cryptographic system. Signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if mathematical representation of file is well-designed and implemented correctly, any alteration of the file will result in a mismatch with the digital signature; the mathematical representation may be produced using an alteration-sensitive, reliably reproducible algorithm, such as a hashing algorithm as described in further detail below. A mathematical representation to which the signature may be compared may be included with signature, for verification purposes; in other embodiments, the algorithm used to produce the mathematical representation is publicly available, permitting the easy reproduction of the mathematical representation corresponding to any file.

In an embodiment, a digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Nonprovisional application Ser. No. 16/682,809, filed on Nov. 13, 2019, and entitled "METHODS AND SYSTEMS FOR IMPLEMENTING AN ANONYMIZED ATTESTATION CHAIN," the entirety of which is incorporated herein by reference.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a remote device as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module 116 as described in further detail below; in such scenarios, authentication may include proof by the secure computing module 116 that the secure computing module 116 possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Certificate authority may be implemented in a number of ways, including without limitation as described in U.S. Nonprovisional application Ser. No. 16/680,787, filed on Nov. 12, 2019, and entitled "METHODS AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Non-provisional application Ser. No. 16/680,787.

Still referring to FIG. 1, digital signatures may be generated using a secure computing module 116. A single key may be used in one or more digital signatures, such as signatures used to receive and/or transfer possession of crypto-currency assets; the key may be discarded for future use after a set period of time. In an embodiment, varied inputs including variations in local physical parameters, such as fluctuations in local electromagnetic fields, radiation, temperature, and the like may be combined with key-generation circuits or methods, such that an almost limitless variety of private keys may be so generated. In an embodiment, at least a remote device and/or secure computing module 116 may convert immediate output from PUF 124 into key in the form of a binary number. This may be performed, without limitation, using a fuzzy extractor, such as those used to convert slightly variable signals from biometric samples or the like predictably into keys by having certain variation tolerances in the binary encoding process. Private key extraction may utilize additional corrective measures, including as a nonlimiting example machine learning, neural networks, convolutional neural networks and the like, or other approaches to provide error correction over the operating temperature range of the device, to ensure consistency in key extraction. Private key generation may alternatively or additionally incorporate true random number generator(s) (TRNGs), pseudorandom number generators (PRNGs) and related devices. Extraction may include extraction of a symmetric key; for instance, at least a remote device and/or secure computing module 116 may extract one or more random numbers based on a PUF 124 output to create a symmetric key as described above. Alternatively or additionally, extraction may include extraction of a private key of a public key cryptographic system.

Still referring to FIG. 1, key extraction may include use of a number output by a PUF 124 or other circuit to generate a public and private key pair. For instance, such a number output may be used as a seed in an elliptic curve cryptographic system. In a non-limiting example, output may include a random number generated within a desired interval, which may be achieved, for instance, by setting the number of output bits to be provided from a PUF 124; steps along a chosen elliptic curve may then be performed using random number to generate a public key. Initial point on elliptic curve and elliptic curve may be selected using an additional random numbers, which may be generated using any suitable method; random numbers associated with curves having known vulnerabilities may be discarded, according to mathematical descriptors or other characteristics of such vulnerabilities as stored in memory of or accessible to at least a remote device and/or secure computing module 116. Persons skilled in the art, upon reading the entirety of this disclosure, will be aware of various ways in which a random number may be used to generate a private and public key pair consistently with this disclosure.

Still viewing FIG. 1, Key extraction may utilize a numerical output from a PUF 124 or other element of secure computing module 116 to generate an RSA private key; this may be accomplished, for instance, by using numerical outputs to generate RSA primes. RSA primes may be generated, as a general matter, by obtaining a random or pseudorandom odd number, checking whether that number is prime, and if it is not, repeatedly incrementing by 2, or some other amount leading to additional odd numbers, and rechecking until a prime is discovered. PUF 124 and/or elements of secure computing module 116 may generate one or more random numbers, for instance by using one or more PUFs as described above; any suitable algorithm may be used for generating a prime from a random number to produce pairs of primes usable as RSA factors. Random numbers below a threshold size may be discarded, and other filtering processes may be employed to discard potentially insecure prime factors. Persons skilled in the art, upon reviewing the entirety of this disclosure, will be aware of many suitable methods for creating RSA primes, and using such primes to generate RSA keys, using random numbers output by PUFs or other elements. Keys may be used to generate exponents for a cryptographic system such as Diffie-Helman or ElGamal that are based on the discrete logarithm problem.

Continuing to view FIG. 1, digital signature may be generated using a digital signature using a direct anonymous authentication protocol (DAA). In an embodiment, DAA is an anonymous digital signature scheme, which instead of reliance on a certificate authority to link a particular private key to a particular party, uses reference to a group public key or to multiple public keys to verify an anonymous signature. Secure computing module 116 may act as a "first signer" of a digital signature, signing with a private key produced from a secret generator as described above. In an embodiment secure computing module 116 signs an element of data using the private key. A second signer, which may be secure computing module 116 and/or an additional element coupled thereto, may previously or subsequently sign the element of data or another element linked to the element previously signed; alternatively or additionally, second signer may use information or signature elements provided by secure computing module 116 to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof.

With continued reference to FIG. 1, secure computing module 116 may implement one or more methods of attested computation. Attested computation may include or involve one or more methods to ensure that computation of a program, known as an attested program, is trusted and signed by secure computing module 116 and/or computing device incorporating secure computing module 116; this may be supported by means to assert the state of the system memory, code, and input data. In an embodiment, attested computing may include or involve one or more methods to authenticate a boot loader. An authenticated boot loader may include a first code that the secure computing module 116 may run upon system initialization and is responsible for checking the measurements and/or signatures of subsequent components either locally or by utilizing a piece of trusted hardware such as a TPM 120. Authenticated boot loaders may differ in practice by how they obtain their attestation root key, whether a root of trust for measurement/verification differs from the root of trust for attestation, and whether components are verified using a signature, in non-limiting examples, but are considered for purposes of this description secure or authenticated boot loaders. Attested computation may further rely upon secure microcode and/or a trusted software component, and/or secure signing enclaves, which are constructions that protect memory access from operating system level operations. Attested computation may rely upon wholly or in part on a measurement root, which computes a cryptographic hash of a trusted software component, and/or may generate a trusted software component attestation key pair and certificate based on the trusted software component's hash. In a representative embodiment, measurement root may read the processor key derivation secret and derive a symmetric or asymmetric key pair key based upon the trusted software component's hash. In an embodiment the measured root may utilize at least a processor key derivation secret to derive a symmetric or asymmetric key pair for decrypting a trusted software component and may include subsequent evaluation of the trusted software component. In an embodiment, the trusted software component may contain a header that contains the location of the attestation existence flag. In an embodiment, the measurement root may produce an attestation certificate by signing the trusted software component's private attestation key. The measurement root may generate a symmetric key or other cryptographic key for the trusted software component so it may encrypt its private attestation key and store it in untrusted memory. Attestation may be used to attest any computing process and/or datum, including without limitation sensor readout, attested time, attested geographical data such as without limitation global positioning system (GPS) data, and the like.

In an embodiment, secure computing module 116 and/or a computing device incorporating secure computing module 116 computes a cryptographic hash of a system state when performing a trusted computation. System state may include, without limitation, program code and/or one or more elements of data being computed. A resulting cryptographic hash of system state may be stored in one or more trusted or secured memories as described above. Secure computing module 116 and/or computing device incorporating secure computing module 116 may append a cryptographic signature based upon any private key that may be associated with secure computing module 116 as described herein. Secure computing module 116 and/or computing device incorporating secure computing module 116 may operate a security reset of working memory prior to load of data for trusted computation; for instance, the secure computing module 116 and/or computing device incorporating secure computing module 116 may append a hash of the memory to cryptographic hash of system state following reset and prior to loading data. Secure computing module 116 and/or computing device incorporating secure computing module 116 may append its authentication signature of memory page tables and/or memory tables. Upon completion of the trusted computation, which may include execution of program code of system state, secure computing module 116 and/or computing device incorporating secure computing module 116 may append an output value of the trusted computation to cryptographic hash of system state. In an embodiment, an output value of the trusted computation may itself be cryptographically hashed and/or encrypted; encryption may be performed using any form of hardware or software-based encryption that may be associated with secure computing module 116. Secure computing module 116 and/or computing device incorporating secure computing module 116 may include a system to compute one or more hash trees of cryptographic hash of the computation, system state, and/or outputs; secure computing module 116 and/or computing device incorporating secure computing module 116 may store the one or more hash trees within the trusted computation boundary. Hash trees may be appended to the trusted computation hash. Any process steps or components described above as performing trusted and/or attested computing may be performed or omitted in any order or combination as will be apparent to those skilled in the art, upon reading the entirety of this disclosure; for instance, order of appending data may be done in any combination.

Still referring to FIG. 1, examples of a secure computing modules 108 may include, without limitation, TPM 120 as described above. The secure computing module 116 may include TPM 120 combined with a boot-measuring protocol using hash trees, Merkle trees, or the like to measure boot entries to create an "attested boot," additionally or separately from the attested computation description described above. A secure computing module 116 may include a trusted execution technology (TXT) module combining a TPM 120 with establishment of a secure container at run-time; secure container may be isolated from a software stack and OS of at least the transaction authentication node 104 and/or use TPM 120 to measure and attest to secure container prior to launch. Secure computing module 116 may implement a trusted enclave, also known as a trusted execution environment (TEE) or secure enclave. In an embodiment, a trusted enclave may be a portion of a computing device that is isolated from the main processor of the computing device. Isolation may be achieved using elements of secure computing module 116 as described above, including isolation of memory. Isolation of memory may be achieved through any process or architecture as described above for secure memory, including encryption using a cryptographic system a decryption and/or encryption key to which a secure processor or TPM 120 has access, but to which a CPU or other main processor, as well as input/output devices or connections, does not and/or use of dedicated cache lines or the like to physically separate memory accessible to secure computing module 116 from CPU and/or input/output devices or connections. Inputs and outputs to and from trusted enclave may be restricted and controlled tightly by a secure processor and/or TPM 120 as described above, including software security monitors. Trusted enclaves may be considered protected memory primitives in which the program stack and stack pointer are reset prior to loading of code into the enclave and flushed prior to exiting trusted enclave operation. In general trusted enclaves may be defined as hardware or software primitives that prohibit unauthorized access to memory segments during execution of sensitive code, including via access to processor caches. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. The Sanctum architecture and Ascend secure infrastructure from MIT, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., RISC-V physical memory protection (PMP) based isolated software modules, and/or any other suitable architecture. Persons skilled in the art, upon reviewing the entirety of this disclosure, will be aware of various additional or alternative trusted computing processes that may be used to implement secure computing module 116, TEE, or trusted enclaves as disclosed herein. System 100 may incorporate or communicate with a certificate authority. In an embodiment, attested computing may include use of a secure computing module 116 to load and initiate a software monitor which may perform further attested computing steps as described above. Use of a secure computing module and/or one or more elements thereof to instantiate a software monitor based in a hardware root of trust are described in U.S. Nonprovisional application Ser. No. 16/682,371, filed on Nov. 13, 2019, and entitled "METHODS AND SYSTEMS FOR ANONYMOUS HARDWARE ATTESTATION," the entirety of which is incorporated herein by reference.

Further referring to FIG. 1, and as described in further detail below, plurality of remote devices may be further designated and/or categorized according to roles that such devices may play in machine-learning tasks. As a non-limiting example, a remote device of plurality of remote devices 112 may be designated and/or referred to as a data storage device 128, defined for the purposes of this disclosure as a device configured to and/or assigned to perform a data-storage task as described in further detail below. As a further non-limiting example, a remote device of plurality of remote devices 112 may be designated and/or referred to as a model-generation device 132, defined for the purposes of this disclosure as a device configured to and/or assigned to perform a model-generation task as described in further detail below. Data storage tasks and model-generation tasks may be segregated from each other and/or may be performed by a single device; furthermore, a device may act as a model-generation device 132 for one machine-learning process and a data storage device 128 for another, or vice-versa.

Still referring to FIG. 1, one or more elements of data described in this disclosure, such as digital signatures, authorization tokens, measurements and/or other data from attested computing sessions, or the like may be stored in a secure listing. A "secure listing," as used in this disclosure, is a data structure including digitally signed assertions, credentials, and/or authentication tokens, where "including" an element of data signifies containing the element itself and/or a representation thereof such as a cryptographic hash, Merkle root, or the like, such that inclusion or "membership" in the secure listing can be proven. Membership in the secure listing may be revoked, in non-limiting example a secure listing may define the set of non-revoked members within a given temporal epoch. In non-limiting example, Membership may be proven by demonstrating that a member is not on a revocation list by means of secure proof or any method known to those skilled in the art. A secure listing may include a cryptographic accumulator. A "cryptographic accumulator," as used in this disclosure, is a data structure created by relating a commitment, which may be smaller amount of data that may be referred to as an "accumulator" and/or "root," to a set of elements, which may include without limitation textual elements, authentication tokens, digitally signed assertions, and/or credentials, together with membership and/or nonmembership proofs for any element in the set. In an embodiment, these proofs may be publicly verifiable against the commitment. A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. For instance, a cryptographic accumulator may be implemented as a Merkle tree and/or hash tree, in which each accumulated element created by cryptographically hashing a lot of data. Two or more accumulated elements may be hashed together in a further cryptographic hashing process to produce a node element; a plurality of node elements may be hashed together to form parent nodes, and ultimately a set of nodes may be combined and cryptographically hashed to form root. Contents of root may thus be determined by contents of nodes used to generate root, and consequently by contents of accumulated elements, which are determined by contents of lots used to generate accumulated elements. As a result of collision resistance and avalanche effects of hashing algorithms, any change in any lot, accumulated element, and/or node is virtually certain to cause a change in root; thus, it may be computationally infeasible to modify any element of Merkle and/or hash tree without the modification being detectable as generating a different root. In an embodiment, any accumulated element and/or all intervening between accumulated element and root 308 may be made available without revealing anything about a lot of data used to generate accumulated element.

Continuing to refer to FIG. 1, a secure listing may include a zero-knowledge set. A "zero-knowledge set," as defined in this disclosure, is a set of elements of textual data such as strings, to which a prover may commit such that after commitment the prover can prove, for any textual datum, whether the textual datum is or is not in the set without revealing any knowledge about the set and/or any element thereof beyond the verity of such membership assertions.

Continuing to refer to FIG. 1, a secure listing may include a range proof, defined for purposes of this disclosure as a set-membership proof with respect to a set that is a sequence of values on a range between upper and lower bounds, such as an open or closed set on the real number line or the like.

Still referring to FIG. 1, a secure listing may include a temporally sequential listing, which may include any set of data used to record a series of at least a digitally signed assertion in an inalterable format that permits authentication of such at least a digitally signed assertion. In some embodiments, secure listing records a series of at least a digitally signed assertion in a way that preserves the order in which the at least a digitally signed assertion took place. Secure listing may be accessible at any of various security settings; for instance, and without limitation, secure listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping.

Still referring to FIG. 1, secure listing may preserve the order in which the at least a digitally signed assertion took place by listing them in chronological order; alternatively or additionally, secure listing may organize digitally signed assertions into sub-listings such as "blocks" in a blockchain, which may be themselves collected in a temporally sequential order; digitally signed assertions within a sub-listing may or may not be temporally sequential. In an embodiment, the secure listing may be a directed acyclic graph (DAG), in which multiple branches may be generated on or by different devices implementing secure listing, and branches may be merged into one another, while a hash chain or similar structure ensures that branches cannot go "back in time" whether merged or not; secure timestamps and/or attested time may be further included to impose a temporal order on a DAG or other secure listing. The ledger may preserve the order in which at least a digitally signed assertion took place by listing them in sub-listings and placing the sub-listings in chronological order. The secure listing may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a digitally signed assertion to the ledger, but may not allow any users to alter at least a digitally signed assertion that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Secure listing may be incorporated in, stored in, or incorporate, any suitable data structure, including without limitation any database, datastore, file structure, distributed hash table, or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 1, secure listing, once formed, cannot be altered by any party, no matter what access rights that party possesses. For instance, secure listing may include a hash chain, in which data is added during a successive hashing process to ensure non-repudiation. Secure listing may include a block chain. In one embodiment, a block chain is secure listing that records one or more new at least a digitally signed assertion in a data item known as a sub-listing or "block." An example of a block chain is the BITCOIN block chain used to record BITCOIN transactions and values. Sub-listings may be created in a way that places the sub-listings in chronological order, and links each sub-listing to a previous sub-listing in the chronological order, so that any computing device may traverse the sub-listings in reverse chronological order to verify any at least a digitally signed assertion listed in the block chain. Each new sub-listing may be required to contain a cryptographic hash describing the previous sub-listing In some embodiments, and still referring to FIG. 1, secure computing module 116 and/or remote device may integrate a precision clock reference for determination of locations and latencies of nodes in the network graph. In non-limiting example, the precision clock reference may be a cesium- or rubidium-based atomic clock, active hydrogen maser, GPS disciplined oscillator, precision crystal oscillator, SAW oscillator, quartz oscillator or related that provides microsecond or better timing accuracy. In some embodiments, precision time may be used to establish physical distance by inference from latency statistics of nodes in the network, whether using probabilistic, Bayesian or other statistical methods, machine learning classifiers or other. In some embodiments, changes in inferred physical distance or latency between nodes in the graph may be used to flag potentially compromised secure computing modules 116, man in the middle or other attacks.

Figure 2:
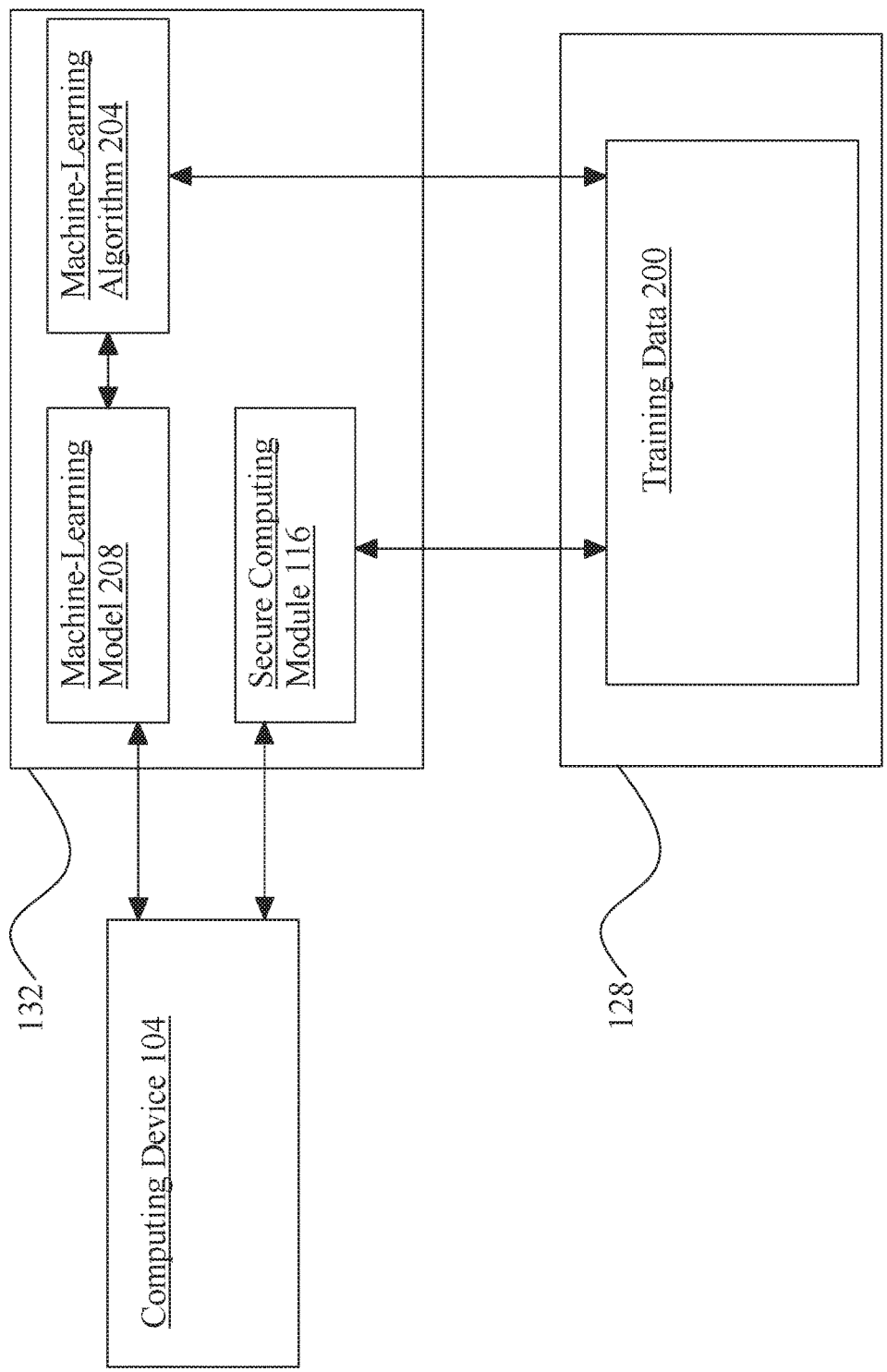
FIG. 2 is a block diagram illustrating embodiments of systems and processes for machine-learning.

Referring now to FIG. 2, computing device 104 may delegate and/or assign one or more storage and/or computational processes and/or tasks used in machine learning machine-learning processes to one or more remote devices 112. A "machine-learning process," as used in this disclosure, is a process that automatically uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 2, training data 200, as used herein, is data containing correlations that a machine-learning process may use to model relationships between two or more categories of data elements. For instance, and without limitation, training data 200 may include a plurality of data entries, each entry representing a set of data elements that were recorded, received, and/or generated together; data elements may be correlated by shared existence in a given data entry, by proximity in a given data entry, or the like. Multiple data entries in training data 200 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 200 according to various correlations; correlations may indicate causative and/or predictive links between categories of data elements, which may be modeled as relationships such as mathematical relationships by machine-learning processes as described in further detail below. Training data 200 may be formatted and/or organized by categories of data elements, for instance by associating data elements with one or more descriptors corresponding to categories of data elements. As a non-limiting example, training data 200 may include data entered in standardized forms by persons or processes, such that entry of a given data element in a given field in a form may be mapped to one or more descriptors of categories. Elements in training data 200 may be linked to descriptors of categories by tags, tokens, or other data elements; for instance, and without limitation, training data 200 may be provided in fixed-length formats, formats linking positions of data to categories such as comma-separated value (CSV) formats and/or self-describing formats such as extensible markup language (XML), enabling processes or devices to detect categories of data.

Alternatively or additionally and continuing to refer to FIG. 2, training data 200 may include one or more elements that are not categorized; that is, training data 200 may not be formatted or contain descriptors for some elements of data. Machine-learning algorithms and/or other processes may sort training data 200 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 200 to be made applicable for two or more distinct machine-learning algorithms as described in further detail below. Training data 200 used by as described in this disclosure may correlate any input data as described in this disclosure to any output data as described in this disclosure.

Still referring to FIG. 2, machine-learning processes may include performance of a machine-learning algorithm 204 to generate a machine-learning model 208. A machine-learning model 208, as used herein, is a mathematical representation of a relationship between inputs and outputs, as generated using any machine-learning process including without limitation any process as described above, and stored in memory; an input is submitted to a machine-learning model 208 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 208 may be generated by creating an artificial neural network, such as a convolutional neural network comprising an input layer of nodes, one or more intermediate layers, and an output layer of nodes. Connections between nodes may be created via the process of "training" the network, in which elements from a training data 200 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Continuing to refer to FIG. 2, a computing device may be designed and configured to create a machine-learning model 208 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithm 204$s$ may include, without limitation, linear discriminant analysis. Machine-learning algorithm 204 may include quadratic discriminate analysis. Machine-learning algorithm 204$s$ may include kernel ridge regression. Machine-learning algorithm 204$s$ may include support vector machines, including without limitation support vector classification-based regression processes. Machine-learning algorithm 204$s$ may include stochastic gradient descent algorithms, including classification and regression algorithms based on stochastic gradient descent. Machine-learning algorithm 204$s$ may include nearest neighbors algorithms. Machine-learning algorithm 204$s$ may include Gaussian processes such as Gaussian Process Regression. Machine-learning algorithm 204$s$ may include cross-decomposition algorithms, including partial least squares and/or canonical correlation analysis. Machine-learning algorithm 204$s$ may include naïve Bayes methods. Machine-learning algorithm 204$s$ may include algorithms based on decision trees, such as decision tree classification or regression algorithms. Machine-learning algorithm 204$s$ may include ensemble methods such as bagging meta-estimator, forest of randomized tress, AdaBoost, gradient tree boosting, and/or voting classifier methods. Machine-learning algorithm 204$s$ may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training data 200 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data 200.

Still referring to FIG. 2, machine-learning algorithm 204s may include supervised machine-learning algorithm 204s. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. Scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 200. Persons skilled in the art, upon reviewing the entirety of this disclosure, will be aware of various possible variations of supervised machine learning algorithms that may be used to determine relation between inputs and outputs.

With continued reference to FIG. 2, supervised machine-learning processes may include classification algorithms, defined as processes whereby a computing device derives, from training data 200, a model for sorting inputs into categories or bins of data. Classification may be performed using, without limitation, linear classifiers such as without limitation logistic regression and/or naive Bayes classifiers, nearest neighbor classifiers, support vector machines, decision trees, boosted trees, random forest classifiers, and/or neural network-based classifiers.

Still referring to FIG. 2, machine learning processes may include unsupervised processes. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Continuing to refer to FIG. 2, machine-learning processes may include a lazy-learning process 212 or a plurality thereof. A lazy-learning process 212 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 200. Heuristic may include selecting some number of highest-ranking associations and/or training data 200 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithm 204s as described in further detail below.

In an embodiment, and continuing to refer to FIG. 2, where remote devices 112 are so designated, training data 200 may be stored, as a data storage task, on at least a remote device designated as a data storage device 128, while one or more machine-learning algorithm 204s may be performed on at least a remote device designated as a model-generating device 132; the latter may, for instance, request training data 200 in lots and/or batches from the former while performing iterative calculations and/or process steps of machine-learning algorithm 204s. Model-generating device 132 may possess a decryption key for decrypting data and/or lots thereof stored on data-storage device 128, while the latter may not possess the decryption key, for instance as described in further detail below.

Figure 3:
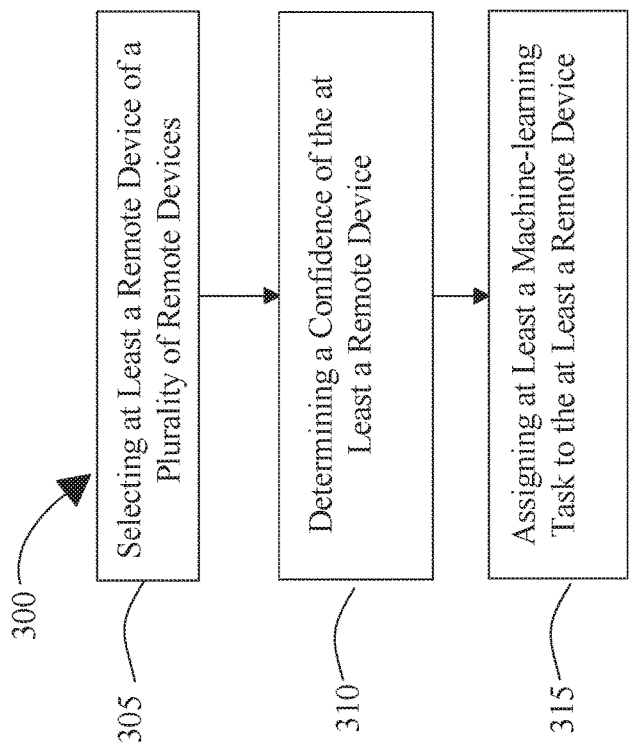
FIG. 3 illustrates particular implementations of various steps of a method of machine learning using a distributed framework.

Referring now to FIG. 3, an exemplary embodiment of a method 300 of machine learning using a distributed framework. At step 305, a computing device selects at least a remote device of a plurality of remote devices. Selecting may include identifying at least a remote device of a plurality of remote devices 112, where "identifying" signifies identifying and/or verifying an association of the at least a remote device with a particular identity of a specific machine and/or person, with a verification datum associated with a digital signature performed by the particular machine, with a group key in which the at least a remote device is at least a member, with a credential issued to the device, or the like; in other words, identification as used in this disclosure does not necessarily mean identification of a specific device or person, but may signify identification of a particular pseudonym, of membership in a group, or of receipt of a credential. Identifying may include, as a non-limiting example, comparing at least a datum received as an identifier from at least a remote device to one or more stored values; one or more stored values may be stored in a temporally sequential listing as described above. One or more stored values may be stored in a database or other data structure. Identifying may include comparison of a digitally signed assertion and/or secure proof, as described in further detail below, in a temporally sequential listing or other data structure to a digitally signed assertion and/or secure proof received from at least a remote device. Identifying the at least a remote device may include evaluating a secure proof and/or digital signature, for instance as described above, generated by the at least a remote device and identifying the at least a remote device as a function of the secure proof.

In an embodiment, and still viewing FIG. 3, identifying the at least a remote device may include identifying a first remote device using a first identification protocol and identifying a second remote device using a second identification protocol, wherein the first identification protocol is distinct from the second identification protocol. As a non-limiting example, a first remote device of at least a remote device may be identified using a TTP protocol, while a second may be identified using a DAA protocol. As a further example, a first remote device may be identified using a first version of a secure computing module 116 incorporated in the first remote device, while a second remote device may be identified using a second version of a secure computing module 116; the first version may, for instance, be a GhostRider implementation while the second is an SGX implementation, or the like. In an embodiment, identification of remote devices using heterogenous methods decreases the likelihood of an exploit successfully compromising all evaluators, as such an exploit would be required to take advantage of a potentially wide range of different vulnerabilities. Furthermore, in an embodiment computing device 104 may perform a time-of-evaluation selection of identification protocols, for instance by selecting from a stored menu of protocols using a random number generator or pseudorandom number generator; this may further decrease the probability of a successful exploit.

Still referring to FIG. 1, selecting the at least a remote device may include evaluating a secure proof generated by the at least a remote device and selecting the at least a remote device as a function of the secure proof. Selection may alternatively or additionally include determining a confidence level of and/or in at least a remote device, which may be performed according to any process described below and selecting the at least a remote device according to the determination as a function of the at least a confidence level. A selected at least a remote device may form a distributed framework. A distributed framework, as used herein, is a network containing one or more computing devices amongst which computational and/or data storage tasks are distributed, including without limitation computational tasks and/or data storage tasks as disclosed in further detail herein. Distributed framework may enable a device calling upon distributed framework, including without limitation computing device 104, to treat one or more network-connected devices assembled in the distributed framework as a single device or pool that performs computational and/or storage tasks. Distributed framework may use any suitable protocol for such task distribution, including without limitation any protocol and/or protocols as described herein, the Message Passing Interface (MPI) protocol, the HADOOP protocol promulgated by the Apache Software Foundation of Wakefield, Mass., and or the SPARK protocol promulgated by the Apache Software Foundation. Selecting distributed framework may include selecting a distributed framework including at least a remote device. Distributed framework may include solely the at least a remote device; for instance, computing device 104 may select one or more remote devices having confidence levels recorded in temporally sequential listing and select the one or more remote devices as the distributed framework. Alternatively or additionally, one or more remote devices and/or other devices may be selected for distributed framework by at least a remote device and/or using first remote device as a reference point.

Still referring to FIG. 3, selections of remote devices for distributed framework may be determined according to proximity according one or more measures of distance or time between each remote device and computing device 104, between at least a remote device and each selected remote device, and/or between at least a remote device and computing device 104, and/or between devices to be selected for distributed framework. For instance, and without limitation, where the plurality of remote devices is connected to the computing device via a network, selecting the distributed framework may include selecting at least a proximate remote device of the plurality of remote devices in a graph representing the network; a proximate at least a remote device on a graph, may include, for instance, a at least a remote device within a certain number of steps through the graph from the once device to another. Steps may also be weighted according to, e.g., estimates of physical distance or length of wire between remote devices 112 connected by steps, as measured using network latency analysis and/or other processes for instance as described below. As another non-limiting example, selecting the distributed framework may include selecting at least a geographically proximate remote device of the plurality of remote devices. Geographical location of computing device 104, at least a remote device and/or at least a device selected as part of distributed framework may be performed by analysis of IP addresses, which may be compared to stored information mapping such addresses to particular geographical locations or the like; geographical location of any devices as described above may alternatively or additionally be determined using navigational facilities, such as the global positioning system (GPS) or other protocols used to determine the location of a device. Distance between devices may be computed using this information and compared to a threshold value; a device may be selected only if distance from computing device 104 and/or at least a remote device is below the threshold value, which may include, for instance, a radius of a certain number of miles or kilometers around the determined location of the computing device 104, at least a remote device, and/or another device.

With continued reference to FIG. 3, selecting the distributed framework may include selecting at least a temporally proximate remote device; this may be at least a remote device that under network latency analysis, time for response to a "ping" signal, or the like presents a likelihood of a more rapid response. Alternatively or additionally, past response times and/or past times in which generation of appraisals as described in further detail below was performed may be recorded in memory 108 and/or in temporally sequential listing; selection of at least a remote device may be performed based on past performance time. Selection of distribute framework may include selection of at least a device to minimize total communication latency, where total communication latency is total expected time for each remote device, or other device, to respond with an appraisal as described in further detail below; such selection may involve determining, for instance, a selection of plurality of remote devices 112 presenting an optimal or near-optimal network traversal time, which may be computed using node-count distances, geographical distances, network communication latency times, and/or expected performance times by particular remote devices 112. Such optimization may involve a near-optimal resolution of a "traveling salesman" problem, including without limitation a "greedy algorithm" in which each selection step involves choosing a locally optimal remote device 112; for instance, computing device 104 may choose a first "nearest" remote device 112 as measured by any of the above metrics, including any measure of actual or path distance and/or any measure of communication or computation latency. Continuing the example, computing device 104 may subsequently select a second remote device according to a locally optimal next selection under the above-described metric or metrics, selecting from locally optimal steps that either at least a remote device, computing device 104, either, or both may perform. This may be repeated until a desired number of remote devices 112 is selected; "desired" number may be a raw threshold number, an aggregate confidence level as described in further detail below, or the solution to another optimization problem such as optimization of confidence versus speed as described in further detail below. Alternatively or additionally, optimal selection may make use of data concerning previously performed transactions; use of such data may include selection of an acceptably rapid previous transaction, or use of a plurality of previous selections to produce an algorithmic or mathematical solution to optimal selection using, e.g. a polynomial regression process, a neural-net machine learning process, or the like. Persons skilled in the art will be aware of various machine learning, deep learning, or other adaptive techniques that may be used to approach such an optimization problem, upon reviewing the entirety of this disclosure.

Still referring to FIG. 3, selection may include selection of only highly trusted remote devices, for instance as determined by determination of confidence levels as described below, such that the fewest remote devices are required for a given security requirement. These methods may be used to optimize network performance of authentication processes. In another example, additional data as described above that are incorporated into blocks or otherwise made available to nodes of the network may be utilized to optimally select which remote devices are selected.

In another embodiment, and continuing to refer to FIG. 3, selecting distributed framework may include establishing an aggregate confidence-level threshold determining confidence levels of one or more remote devices of the plurality of remote devices, and/or of one or more other devices that may be incorporated in distributed framework, aggregating the confidence levels of the one or more remote devices to generate an aggregate confidence level, determining that the aggregate confidence level satisfies the aggregate confidence-level threshold, and selecting the one or more remote devices. Evaluation of confidence level of each of the plurality of remote devices may be performed as described in further detail herein. Establishment of an aggregate confidence level in a plurality of remote devices 112 or other devices having a plurality of associated confidence levels may involve, e.g., adding together confidence levels; alternatively, aggregate confidence level may be computed by viewing each confidence level as a probability, calculating an aggregate probability by averaging or other statistical combination processes, and selecting remote devices 112 or other devices so as to result in an aggregate probability representing a desired confidence level. Alternatively or additionally, a machine-learning algorithm 204 as described above may analyze past transactions to determine an optimal mathematical operation for calculating an aggregate confidence level. As noted below, a desired confidence level to be used as a threshold may be computed in turn by reference to a user input indicating a desired confidence level, a minimal confidence level set by computing device 104 and/or network, for instance to ensure some degree of overall network integrity, a calculation based on a value of a transaction recorded in at least a digitally signed assertion 116, or the like.

Still referring to FIG. 3, selecting the distributed framework may include generating a cost function of confidence level and communication latency and minimizing the cost function. In an embodiment, cost function may be selected to optimize one or more user and/or network goals. Goals to be optimized may include, without limitation, a desired degree of latency (defined herein as a speed with which at least a computational or storage task to be performed by distributed framework occurs), security (which may be defined, e.g., as a degree of confidence in the accuracy of the task, a degree of confidence in the data integrity of the task, a degree of confidence in protection from data breeches and/or theft of information, and/or a degree of confidence in faithful performance of the computation by distributed framework), anonymity (defined as a degree of difficulty in obtaining information concerning a user of querying device and/or a person entering a transaction on temporally sequential listing), and throughput (defined as an aggregate or average latency across users, remote devices, and or other devices). There may be tradeoffs between the above-mentioned four goals. For instance, if user wishes to perform a task rapidly, reducing the number of nodes in at least a highly trusted at least a remote device may improve the speed with which authentication can take place, as may selection of proximate nodes as described above. Anonymity, however, may favor selection of more widely scattered remote devices or other devices to make it more difficult to deduce where computing device 104 is located geographically or within network; additional measures to ensure anonymity, such as use of an anonymizing protocol such as the Tor protocol promulgated by The Tor Project, Inc., which functions by directing all internet traffic through a network containing a plurality of relays to conceal a user's location and usage from network surveillance and/or traffic analysis attempts, using "onion routing" processes, or the like may further increase latency and slow down authentication. Similarly, where greater security is a goal selections a highly trusted devices may be maximized, and/or across a wider range of network locations and/or geographical locations to improve the likely independence of nodes, also slowing the process. Selection of greater numbers of nodes, with lesser network latency between them, may also enable greater performance or capacity in computational or storage tasks. Thus, a person or device who wants to perform a task very secretly may desire a very high degree of security and anonymity and may accept a greater degree of latency in exchange. A user or device seeking to perform a task with a high degree of security, but without a need for rapid performance or storage capacity may use a small number of highly trusted nodes. As another non-limiting example, a task may require fast, high-security, processing, relying on high degree of trust and low anonymity. As a further example, processes involving medical data may require high anonymity and high security, which may be emphasized above speed. In an embodiment, the ability of method 300 or variations thereof to modify these parameters for optimal results in different scenarios may be highly advantageous over existing methods.

With continued reference to FIG. 3, cost function may be dynamically set by a selected degree of optimization for one or more attributes. Determining degree of optimization may be performed via a user interface, which may be a graphical user interface (GUI), for instance by providing a user with one or more sliders representing desired degrees of security, transaction speeds, and/or levels of anonymity; sliders may be linked to absolute ranges of the attributes or may alternatively be used proportionally to represent relative importance to user of each attribute. Positions of one or more sliders may be reset according to stored mathematical relationships between different items; mathematical relationships may be determined by combining or producing machine-learning processes. A related or separate set of mathematical relationships may be used to determine how selection of at least a highly trusted at least a remote device affects each attribute. Protocol implemented in embodiments herein may support varying security and anonymity demands by the parties to the transactions. For instance, two parties wishing to exchange $5 M over the network will demand commensurate security and require some reduction in anonymity to comply with federal laws, in exchange for slightly longer validation times. Conversely, a customer purchasing a coffee at Starbucks will demand relatively little security and may be fully anonymous; a potential malicious actor utilizing a great number of small transactions to hide a large total transaction from regulators may be thwarted by identifying anonymous certificates that are re-used above some threshold and flagged by the network. This may allow network to self-adapt to meet varying demands.

With continued reference to FIG. 3, mathematical relationships between attributes and each other and/or between attributes and selection of distributed framework may be derived by collection of statistics concerning past transactions. In some embodiments, statistical relationships are determined through one or more machine learning processes; for instance, data describing the speed, authenticity, and anonymity of a plurality of past transactions may be subjected to regression analysis, such as linear or polynomial regression, to determine one or more equations relating one parameter of such transactions to one or more other such parameters. Similarly, a neural net may be provided with such a plurality of past transactions. Machine-learning processes may be supervised and/or unsupervised; for instance, attributes to compare may be preselected to ensure that machine-learning processes result in relationships between desired attributes and transaction parameters. Mathematical relationships may demonstrate, e.g., that a certain number of nodes in at least a highly trusted node results in a 95% degree of confidence, that a second, higher number of nodes results in a 98% degree of confidence, and the like. As a further example, mathematical relationships may associate a level of anonymity, as measured in average proportion information content concerning user and/or computing device 104 obtainable from a transaction, information entropy of transaction, or the like, to average network or geographical distance between nodes of at least a highly trusted node, to selection of protocols to anonymize, and the like. Relationships between, the above parameters and latency may also be represented. Direct relationships between attributes to be optimized may be determined by machine learning processes; alternatively or additionally, such relationships may be determined using relationships of each attribute to parameters of selected device.

With continued reference to FIG. 3, at least a remote device may assist in selection of one or more additional devices, which may be remote devices of plurality of remote devices or may be other devices connected to network. For instance, and without limitation, selecting the distributed framework may include receiving an identification of at least a second remote device of the plurality of remote devices from the at least a remote device, and selecting the at least a second remote device as a function of the identification of the at least a second remote device. The identification of the at least a second remote device may include a digitally signed assertion generated by the at least a remote device; digitally signed assertion may be created using any protocol for creation of a digitally signed assertion, including a digital signature signed with a private key possessed and/or generated by at least a remote device, a secure proof, as defined above, generated according to any protocol or combination of protocols as described above by first remote device, or the like. Identification of at least a second remote device and/or other device may include verification information that may be combined with a secure proof issued by second remote device to verify or authenticate second remote device, including without limitation an address as described above, a public key as described above, a verification associated with a zero-knowledge proof, or the like. Computing device 104 may select one or more of at least a second remote device (or other device), including less than all remote devices of at least a second remote device (or other device) according to any criteria as described above for selection of at least a remote device and/or any device included in distributed framework, including without limitation by determining confidence levels in individual devices and/or aggregate confidence levels, comparison of confidence levels to threshold values, minimization of cost functions and/or optimization of network distance or latency, or any other procedure described above.

At step 310, and still referring to FIG. 3, computing device 104 determines a confidence level of the at least a remote device. At least a confidence level may include a single confidence level assigned to a single remote device, a plurality of confidence levels assigned to a plurality of remote devices, an aggregate confidence level of a plurality of remote devices, or any other single or plural confidence level as described herein. Determining a confidence level may include evaluating at least a digitally signed assertion signed by a remote device of the at least a remote device and determining a confidence level to the remote device as a function of the evaluation of the at least a digitally signed assertion. At least a digitally signed assertion may be identified as signed by at least a remote device using any identification process or protocol as described above. In an embodiment, at least a digitally signed assertion may be incorporated in a secure listing of digitally signed assertions. For instance, where secure listing is a blockchain or similar data structure, each assertion may be included in the blockchain. At least a second digitally signed assertion may include a plurality of digitally signed assertions. For instance, at least a remote device may record a series of digitally signed assertions in temporally sequential listing; each transaction of the series of transactions may be authenticated by any process suitable for authenticating temporally sequential listing, including any process described herein for authentication of temporally sequential listing. As a further non-limiting example, at least a remote device may enter an initial digitally signed assertion attesting to one or more elements of identification and/or authentication, including without limitation attestation of manufacturing date of at least a remote device and/or secure computing module 116, identities, serial numbers, versions, or make of hardware components of at least a remote device and/or secure computing module 116, or the like. Transactions performed by at least a remote device may be scored according to authenticity; for instance, trusted status may be conferred on at least a remote device only if a certain number of authenticated transactions have been performed by at least a remote device, a certain amount of value has been conveyed in authenticated transactions by at least a node, a certain proportion (which may be 100%) of transactions performed by at least a remote device have been successfully authenticated, or any other suitable benchmarking and/or scoring process or combination thereof. At least a digitally signed assertion may include assertions that were recorded in rejected instances of a temporally sequential listing, such as rejected forks; in an embodiment, confidence level may be reduced as a function of a number of rejected forks including assertions signed by at least a remote device, for instance.

Still referring to FIG. 3, determining the at least a confidence level may include receiving a consensus evaluation of the at least a confidence level from a network of remote devices. for instance, all remote devices currently connected to network may determine a confidence level concerning a particular remote device. This determination may be performed, for instance, by authenticating one or more current or past instances of a temporally sequential listing and/or one or more sub-listings thereof. Determination may include identification of one or more rejected instances of temporally sequential listing. Each remote device of plurality of remote devices may provide a confidence level for the remote device to be evaluated. Computing device 104 and/or another processor communicatively coupled to network may calculate an aggregate confidence level based on confidence levels submitted by plurality of remote devices; aggregation may be performed according to any method for aggregation of confidence levels described above. In an embodiment, aggregation may be weighted according to a previously determined confidence level of each remote device of plurality of remote devices performing consensus determination of confidence level of remote device to be evaluated. This may include, e.g., ignoring confidence level submissions from evaluators having confidence levels below a certain threshold; alternatively or additionally, computing device 104 may request confidence level determinations by a plurality of evaluators previously determined to have a confidence level above a certain threshold level. Confidence levels may be established based upon a ranking system by a governing consortium for a network, such that assignment of confidence level for a computing device 104 may occur by comparison to such a ranking system (e.g., based upon attestable properties of the device). Such assignment may require a threshold consensus from previously verified evaluators 112, from an elected committee, the election of such committee being based upon, e.g. a random beacon approach such as proof of elapsed time or other probabilistic approach. Such a committee may be a sub-selection of a set of nodes obtaining a minimum threshold of one or more parameters, e.g., confidence level, length of record of honest transactions, dollar value of honest transactions, association via previous transactions with other highly trusted nodes, or any combination thereof. Each remote device and/or other processor participating in consensus determination of confidence level may perform any action described herein for determining a confidence level, or any combination of such actions.

With continued reference to FIG. 3, determining the at least a confidence level may include evaluating a digitally signed assertion assigning a recorded confidence level to a remote device of the at least a remote device, and determining the confidence level as a function of the recorded confidence level. Digitally signed assertion may be any digitally signed assertion as described herein. Digitally signed assertion may be included in any temporally sequential listing as described herein; temporally sequential listing may include a temporally sequential listing relating identifiers of remote devices to confidence levels, where identifiers may be any data usable as identifiers as described herein. Assignment of confidence level may be performed as a function of identifier; that is, identifier may be linked to an identity of a remote device, which may be used for assignment of confidence level as described in this disclosure. Computing device 104 may receive an instance of temporally sequential listing; receiving may include receiving an entire copy of the instance, receiving a sub-listing, receiving a link to temporally sequential listing, or a portion thereof, stored remotely, receiving digitally signed assertion along with an indication of temporally sequential listing containing digitally signed assertion, or the like. As a non-limiting example, one or more processors, a consensus process, computing device 104, and/or a network of remote devices having a confidence level in excess of a threshold, may have previously evaluated a confidence level in a certain remote device; in an embodiment, such a confidence level may itself be recorded in an assertion listed in temporally sequential listing. A plurality of such assertions, corresponding to a plurality of remote devices, may be listed; as such, computing device 104 may determine confidence level in one or more remote devices solely by retrieving confidence levels so recorded. Alternatively or additionally, computing device 104 may combine such confidence levels with confidence level determinations made by other means. Combination may be performed, e.g., by retrieving such confidence levels from temporally sequential listing for at least a remote device and calculating a confidence level for at least a second remote device by any other process described above. As a further example, computing device 104 may retrieve a confidence level recorded in temporally sequential listing for a given remote device, determine a confidence level for the same remote device, and then aggregate the two confidence levels according to any process as described above for aggregation of confidence levels.

Still referring to FIG. 3, computing device 104 may further weight or modify confidence level according to one or more additional factors. For instance, confidence level may be weighted according to how recently remote device signed a digitally signed assertion in an authenticated instance of temporally sequential listing, where a more recently authenticated assertion may result in a higher confidence level or higher weight assigned to the confidence level, and a less recently authenticated assertion may result in a lower confidence level or a lower weight assigned to that confidence level. As another example a remote device that has recently "sold off" a large amount of value and/or has an assertion in a sub-listing currently awaiting authentication may have its confidence level decreased. As a further example, an evaluator with little or no history, or an anonymous evaluator, may be assigned some minimal or "neutral" confidence level indicating treatment as a "consensus" evaluator rather than a "trusted" evaluator. An evaluator associated with a previous fraudulent transaction may be assigned a confidence level of zero or may be excluded from evaluation processes.

With continued reference to FIG. 3, determining the at least a confidence level may include performing a trusted time evaluation of at least an action performed by the at least a remote device. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via DAA) to verify that the secure computing module 116 is an authentic secure computing module 116 that has the property of attested time.

With continued reference to FIG. 3, secure timestamp may be recorded the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using a secure computing module 116. Additional data may include one or more additional data, including sensor data or a hash of data, that are received or generated by temporal attester 104. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). A TSA may alternatively or additionally be implemented as a distributed TSA, for instance as described in U.S. Nonprovisional application Ser. No. 16/680,787. The use of secure timestamps as described herein may enable systems and methods as described herein to instantiate attested time. Attested time is the property that a device incorporating a local reference clock may hash data, e.g. sensor data, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively or additionally, one or more additional participants, such as other remote devices may evaluate confidence levels in at least a remote device or other party generating secure timestamp and/or perform threshold cryptography with a plurality of such parties, each of which may have performed an embodiment of method to produce a secure timestamp. In an embodiment, remote devices or other parties authenticating first digitally signed assertion may perform authentication at least in part by evaluating timeliness of entry and/or generation of first digitally signed assertion as assessed against secure timestamp. In an embodiment, secure proof is generated using an attested computing protocol; this may be performed, as a non-limiting example, using any protocol for attested computing as described above.

Still referring to FIG. 3, computing device 104 may determine a confidence level in an identity of the at least a remote device; determining the at least a confidence level may include determining the at least a confidence level as a function of the at least a confidence level in the identity. Confidence level in identity may be computed, for instance, using one or more statistical measures of reliability of the identification method used; for instance, a user may enter an instruction on computing device 104 providing statistics indicating success rates of various identification methods. Statistics may be collected based, as a non-limiting example, on discoveries of vulnerabilities in particular identification protocols and/or particular instances of secure computation module. User may alternatively make a subjective assessment, based on expert knowledge, for instance, of a confidence level to assign based on such findings, and enter that confidence level. Statistics and/or user-entered confidence level in identification method may be used as multipliers or otherwise combined with confidence-level calculations as described in further detail below, or otherwise determining a confidence level as a function of the confidence level in the identity. Computing device 104 may also determine confidence level in identity as a function of, for instance, one or more algorithms collecting statistics concerning degree of accuracy in past iterations of method 400 of a particular process for identifying at least a remote device.

At step 315, and still referring to FIG. 3, computing device assigns at least a machine-learning task to the at least a remote device. Assigning includes assigning at least a secure data storage task to the at least a remote device. Thus, as a non-limiting example, assigning the at least a machine learning task may include assigning at least a data storage task to at least a first machine designated as a data storage device 128 and assigning at least a computational task and/or model generation task to at least a second device designated as a model generation device 132; the at least a second device may have a higher confidence level than the at least a first device.

With continued reference to FIG. 3, assigning the at least a machine-learning task may include assigning at least a data storage task to the distributed framework and/or at least a remote device. At least a data storage task, as used herein, is a task whereby the device in question acts as a data store or repository, performing memory storage tasks, data retrieval tasks, query processing tasks, and the like. At least a data storage task may include, without limitation, performing as a database, including without limitation a relational database, key-value datastore, or the like, acting as a node or other element of a distributed data storage network or distributed data storage data structure, storing or acting as a hash table or other data structure for data storage, and/or performing one or more data storage retrieval or writing tasks including processing and responding to queries such as database queries, providing values corresponding to keyvalue relationships, hash table lookups, and the like, and/or providing any data or portion of data stored on device. Data to be used in machine learning, which may include training data 200 sets or other datasets used to perform machinelearning algorithm 204s as described above, may be voluminous in nature; as a result, use of a plurality of devices to store data in lots may present an efficient way to store data that might otherwise require extensive facilities for storage. Thus, data may be divided into lots or sections, each of which is stored on one or more distinct devices, according to any distributed storage process or protocol as described or alluded to herein. As a non-limiting example, assignment of at least a data storage task to the distributed framework may include dividing data to be stored in the at least a data storage task into a first data lot and a second data lot, assigning the first data lot to at least a first data storage device, and assigning the second data lot to at least a second data storage device. First data lot and second data lot may be selected according to one or more criteria; such selection criteria may include, without limitation, selection of data lots to preserve relationships used to perform machine learning computations, such as relationships between input and output data, relationships between variables, and the like. For instance, where a given set of variable values pertains to a given "desired" or real-world output to be used in computation of an error function or cost function, the given set of variable values and desired or real-world output may be placed together in the same data lot; this may enable computation to be performed efficiently using such data. Alternatively, relationships may be maintained by any kind of method for linking or recording relationships between data sets, including without limitation links using relational database tables, parallel table structures, shared record identifiers, or the like; persons skilled in the art, upon reviewing the entirety of this disclosure, will be aware of various ways that relationships between elements of data may be maintained while dividing data between distinct storage locations, data structures, and/or devices.

Still referring to FIG. 3, data may be divided in lots according to storage capacity of devices in which data is to be stored; for instance, and without limitation, if a first device has a certain number of bytes available for storage, a first data lot may be created having a number of bytes equal to or less than that storage capacity, while a second data lot may be created having a number of bytes of data equal or less than the storage capacity of a second device. Data storage may be assigned redundantly; for instance, copies of a first data lot may be stored in several devices or device sets, such that if one copy is degraded, damaged, or destroyed, an undamaged copy may be obtained from a different device. This may also make it more difficult for a bad actor to sabotage machine-learning task, as discussed in further detail below.

In an embodiment, and still referring to FIG. 3, data storage tasks and computational tasks may be divided so that a set of computational tasks that is to be performed together has a corresponding set of data in a data lot that is stored together, where corresponding set of data is a set of data necessary to perform the set of computational tasks; for instance, where a device or set of devices is assigned a task to perform a set of machine-learning computations with regard to one portion of a corpus of data, that portion may be made into a data lot. As a non-limiting example, where at least a machine learning task includes at least a first computational task and at least a second computational task, first data lot may contain data for the first computational task and second data lot contains data for the second computational task. As described in further detail below, in some embodiments computational tasks may be assigned to different devices than data storage tasks. A device that has been selected by computing device 104 and/or an element of distributed framework to perform one or more computational tasks may be named for purposes of this disclosure a "computation device." A device that has been selected by computing device 104 and/or an element of distributed framework to perform data storage tasks may be labeled for the purposes of this disclosure as a "data storage device." It should be noted that a data storage device may act as a computation device and vice-versa, and that a device used as a computation device for one set of machine learning tasks and/or instance of method 300 may be used as a data storage device for another set of machine learning tasks and/or instance of method 300, or vice-versa. In an embodiment, first computational task may be assigned to a first computation device that is proximate to the first data storage device, which may be the data storage device storing first data lot, and second computational task may be assigned to a second computation device that is proximate to the second data storage device; proximity may include any form of proximity as described above including without limitation minimization of geographical distance, network distance, and/or network latency.

Continuing to refer to FIG. 3, computing device 104, at least a remote device, and/or other device may perform one or more actions to ensure data integrity or security of data stored during one or more data storage tasks. Redundant storage, as noted above, may be used to increase the probability that a given lot of data is stored in at least one location without damage. Computing device 104, at least a remote device, and/or another device may generate at least a mathematical representation of data to be stored in the data storage task; at least a mathematical representation may include a cryptographic hash as described above, a checksum, or another such data element, permitting any device to verify that a given lot of data produces the corresponding at least a mathematical representation. Where a given quantity or element of data from lot is likely to be retrieved for a given computational task, as defined above, and/or where data is stored and retrieved in some atomic quantity of data such as "bytes" or "words" in X86 storage, each such given quantity and/or element, or some quantity thereof, may have a mathematical relationship generated; thus, for instance, if the mathematical relationship of a first quantity of data in a given data lot suggests tampering or degradation of that data, but a second mathematical representation of a second quantity data from the lot does not, the second data may be used, while the first may be retrieved from a redundant storage source that does not bear the same corruption or tampering, or may be discarded from use in the computational task.

Still referring to FIG. 3, assignment of at least a data storage task may include encrypting data to be stored in the at least a data storage task. Encryption may be performed according to any cryptographic system as described above, including public or private key cryptographic systems. In an embodiment, computing device 104 and/or at least a computation device encrypts data to be stored using a private key of a private key cryptographic system; private key may, in a non-limiting example, not be shared with at least a data storage device storing private key. In an embodiment, encryption may prevent tampering or unauthorized reading of data by third parties and/or at least a data storage device from reading, deciphering, or modifying the data. Alternatively or additionally, computing device 104, at least a remote device, and/or other device may remove one or more elements of contextual data from data to be stored; for instance, where data describes names or other personal information, and such information is not necessary for use in computation.

In an embodiment, and with continued reference to FIG. 3, different machine-learning tasks may be assigned to devices with different confidence levels. For instance, computational tasks may be assigned to devices associated with very high confidence levels, such as devices including secure computing modules 116, implementing attested boots or other secure computing environments, or the like. Data storage, which may involve encryption of data such that data storage device may not decrypt the data, may be assigned to devices that are, for instance, selected by at least a remote device, identified using methods other than secure computing module 116, or otherwise have a lower confidence score; a lower confidence threshold may be applied for such devices.

Still referring to FIG. 3, assigning the at least a machine-learning task includes assigning at least a model-generation task to the distributed framework. As used herein, a model-generation task is a mathematical or logical operation, or collection thereof, performed by a computing device to implement a machine-learning process, including calculations in regression analysis, optimization of neural nets, and the like, as opposed to storage in memory and/or retrieval from memory of corpuses of data, lots of data, and/or portions thereof. Model-generation tasks may include, without limitation, tasks such as generating a mathematical relationship to fit a dataset, generating an output using that mathematical relationship, comparing that output to a desired or "real-world" output, generating an error function, minimizing an error function, minimizing a cost function, calibrating or recalibrating a cost function, or the like.

Model-generation tasks may involve some data storage of data as necessary for performance of model-generation tasks; a computing device performing model-generation tasks, as opposed to storage tasks as defined below, may be performing storage of data only as needed for the task or tasks currently being performed, as opposed to acting as a repository or data store.

With continued reference to FIG. 3, assigning the at least a model-generation task may include assigning a first model-generation task to a first device of the distributed framework and assigning a second model-generation task to a second device of the distributed framework. Assigning the at least a model-generation task may include assigning the at least a model-generation task to at least a device that performs attested computing. Computing device 104, or another device, may evaluate the attested computing of the at least a device; for instance, and without limitation, computing device 104 or another device may validate that at least a model-generation task was performed on a protocol stack resting on an attested boot, was performed in a known attested or secure computing environment as described above, was performed using any secure computing module as defined above, or the like.

Still referring to FIG. 3, in an embodiment, computing device 104 may perform a remote attested computing process on a model generation device 132, which may cause model-generation device 132 to run model-generation tasks within and/or as part of the remote attested computing process. For instance, and without limitation, computing device may use a local software monitor running on computing device 104 to install a remote software monitor on model-generation device 132. Remote software monitor may be configured to receive at least a program to execute on the model-generation device, where the at least a program may include a program to model-generation task or a subset and/or sub-task thereof. Model-generation task may include any machine-learning algorithm 204 204 as described above, any portion thereof, and/or any process in support thereof, such as query, retrieval, decryption, filtration, and/or formatting of training data 200, or the like. At least a program may alternatively or additionally include at least an additional remote software monitor to install on an additional remote device, for instance to perform attested computation of a program of at least a program a function call therefrom, and/or portion thereof. Remote software monitor may execute received at least a program and/or delegate program, a function call therefrom, and/or portion thereof to an additional remote device and/or component. When executing at least a program, remote software monitor may generate at least a cryptographic hash of the at least a program, inputs to the at least a program, and/or outputs from the at least a program, digitally sign the at least a cryptographic hash of the at least a program and execute the at least a program; additional remote software monitors on additional remote devices may perform the above-described steps to execute programs, which may include model-generation steps and/or generation of further remote devices to execute on further devices, which chain of remote device generation may be extended to an indefinite network of devices acting as model-generation devices 132. Similarly, local software monitor may generate a cryptographic hash of remote software program and/or one or more programs to be executed therewith, inputs to such remote software program and/or one or more programs, and/or outputs from such remote software program and/or one or more programs, sign the cryptographic hash, and then execute the remote software program and/or one or more programs. Local software monitor and/or remote software monitor or monitors may alternatively or additionally be used to perform data storage tasks on data storage devices 128.

In an embodiment, and still viewing FIG. 3, computing device 104, and/or another device in communication with network and/or distributed framework, may assign machine learning tasks to distributed framework in any suitable manner for division of tasks, including distributed storage using, for instance, distributed hash tables, temporally sequential listings, JAVA HDFS as promulgated by Oracle, a resilient distributed dataset, or the like. Assignment of task may be performed by partitioning or dividing data and/or computational tasks by a "master" device amongst one or more "slave" devices; "master" device may be computing device 104, a device having a high confidence level as described above, including without limitation first remote device. For instance, and without limitation, a task requiring processing of a large quantity of data, for instance sorting or searching within the data, may be divided among "slave" devices by partitioning the data into "chunks," each of which is sent to one or more distinct devices; devices may then perform local portions of the overall computing task with regard to their respective partitions, followed by a recombination of the computing outputs to produce a final result. Recombination of outputs may be performed by "master" device. Allocation of computational or data storage tasks may be performed to minimize network latency costs, which may be done using any calculations or processes to minimize latency, minimize network distance, and/or minimize geographical distance, as described above; in other words, "selection" may be performed a first time to select distributed framework, and (optionally) a second time for maximally efficient distribution of tasks.

In a representative embodiment, distribution of a partitionable computation task within a secure distributed framework may be performed by first identifying a "master" device (a single device or committee of devices having a minimum trust level either alone or collectively, such that e.g. the economic value of the computation task is more than met by the security properties of the committee of devices). The master device may act as a secure arbiter to distribute the work done using any of the methods described above, to other nodes whose confidence levels in aggregate are greater than the value of the computation. In a representative embodiment, these compute nodes may be economically incentivized to perform the computations and/or to verify the computations.

In a representative embodiment a master device as described above may act as a broker in a direct financial transaction between the computation requestor and the one or more compute nodes performing work. Assignment of work to compute nodes may be performed using a random beacon or other probabilistic assignment mechanism.

In representative embodiments, master devices are elected by any number of means described above. Master device may represent a federated subnetwork for purposes of distributing work across compute nodes.

In a representative embodiment, the computation requestor's request may be randomly assigned by any number of means described above to a particular master device or may be a direct peer-to-peer arrangement.

In a representative embodiment, a requestor may similarly establish distributed storage of information across a number of storage nodes (analogous to compute nodes). In this scenario the proof of storage may be achieved by a chain of attestation of properties of a storage node and the stored datum.

It is to be noted that the architectures and protocols of attestation described herein simplify to assume that confidence level of a given node is a static parameter. In reality, it is likely that even highly secure devices may come under attack by malicious actors. Conversely, it is conceivable that less secure devices may be subject to attack less frequently than their security profile suggests. Across this continuum, in a representative embodiment, the network may incorporate periodic checks of re-attestation for highly trusted nodes, e.g. established via random beacons or other probabilistic methods. The network may incorporate heuristics of trust to relax need for attestation of less trusted nodes.

In a representative embodiment, the framework may utilize probabilistic back-off protocols to minimize the overhead associated with attestation and proof of authenticity. In a non-limiting example, a random beacon or other probabilistic mechanism may be incorporated into the smart contract within a trusted computing boundary, such that the attestation or other proof of authenticity is a self-directed property of the network nodes. The network may utilize penalty mechanisms, e.g. require further verification, increase the cost of a smart contract or other conceivable mechanisms to incentivize nodes to utilize and maintain probabilistic mechanisms.

In a representative embodiment, trusted nodes in the network may be randomly elected to operate autonomous agents, e.g. machine learning models, deep learning models, convolutional neural networks, feed-forward neural networks and the like that may be implemented within a trusted computing boundary and serve the purpose of optimizing the properties of probabilistic back off of attestation or authentication mechanisms. The result of such optimizations may be incorporated by threshold consensus of such elected agents into the smart contract primitives of the network.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
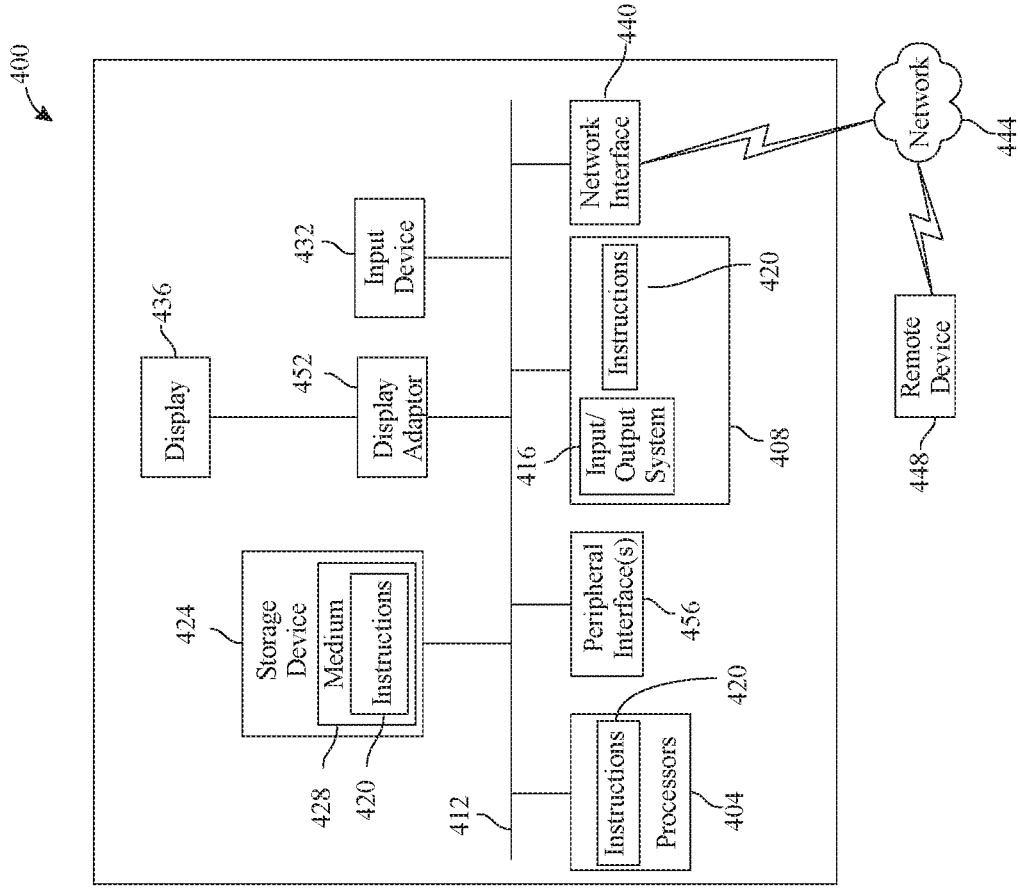
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of machine learning using a distributed framework, the method comprising:
   selecting, by a computing device, at least a remote device of a plurality of remote devices;
   determining, by the computing device, a confidence level of the at least a remote device; and
   assigning, by the computing device, at least a machine-learning task to the at least a remote device, wherein assigning further comprises:
      assigning at least a secure data storage task to the at least a remote device; and
      assigning at least a model-generation task to the at least a remote device, wherein assigning the at least a model-generation task further comprises assigning the at least a model generation task to at least a device of the at least a remote device that performs attested computing.

2. The method of claim 1, wherein selecting the at least a remote device further comprises selecting a plurality of proximate devices.

3. The method of claim 1, wherein assigning the at least a model-generation task further comprises assigning a first machine-learning task to a first device of the at least a remote device and assigning a second machine-learning task to a second device of the at least a remote device.

4. The method of claim 1, further comprising evaluating the attested computing of the at least a device.

5. The method of claim 1 further comprising:
   dividing data to be stored in the at least a data storage task into a first data lot and a second data lot;
   assigning the first data lot to a first data storage device of the at least a remote device; and
   assigning the second data lot to a second data storage device of the at least a remote device.

6. The method of claim 5, wherein:
   the at least a machine learning task further comprises at least a first model-generation task and at least a second model-generation task; and the first data lot contains data for the first model-generation task and the second data lot contains data for the second model-generation task.

7. The method of claim 6 further comprising assigning the first model-generation task to a first model-generation device that is proximate to the first data storage device and assigning the second model-generation task to a second model-generation device that is proximate to the second data storage device.

8. The method of claim 1 further comprising encrypting data to be stored in the at least a data storage task.

9. The method of claim 1, wherein:
the at least a model-generation task is assigned to at least a model-generation device of the at least a remote device;
the at least a data storage task is assigned to at least a data storage device of the at least a remote device; and
the at least a model-generation device has a higher confidence level than the at least a data storage device.

10. A system for machine learning using a distributed framework, the system comprising a computing device communicatively connected to a plurality of remote devices, the computing device designed and configured to:
select at least a remote device of a plurality of remote devices, determine a confidence level of the at least a remote device, and assign at least a machine-learning task to the at least a remote device, wherein assigning further comprises assigning at least a secure data storage task to the at least a remote device and assigning at least a model-generation task to the at least a remote device, wherein assigning the at least a model-generation task further comprises assigning the at least a model generation task to at least a device of the at least a remote device that performs attested computing.

11. The system of claim 10, wherein the computing device is further configured to select the at least a remote device by selecting a plurality of proximate devices.

12. The system of claim 10, wherein assigning the at least a model-generation task further comprises assigning a first machine-learning task to a first device of the at least a remote device and assigning a second machine-learning task to a second device of the at least a remote device.

13. The system of claim 10, wherein the computing device is further configured to evaluate the attested computing of the at least a device.

14. The system of claim 10, wherein the computing device is further configured to:
divide data to be stored in the at least a data storage task into a first data lot and a second data lot;
assign the first data lot to a first data storage device of the at least a remote device; and
assign the second data lot to a second data storage device of the at least a remote device.

15. The system of claim 14, wherein:
the at least a machine learning task further comprises at least a first model-generation task and at least a second model-generation task; and
the first data lot contains data for the first model-generation task and the second data lot contains data for the second model-generation task.

16. The system of claim 15 wherein the computing device is further configured to assign the first model-generation task to a first model-generation device that is proximate to the first data storage device and assigning the second model-generation task to a second model-generation device that is proximate to the second data storage device.

17. The system of claim 10 wherein the computing device is further configured to encrypt data to be stored in the at least a data storage task.

18. The system of claim 10, wherein:
the at least a model-generation task is assigned to at least a model-generation device of the at least a remote device;
the at least a data storage task is assigned to at least a data storage device of the at least a remote device; and
the at least a model-generation device has a higher confidence level than the at least a data storage device.

* * * * *